(12) United States Patent
Matsushita et al.

(10) Patent No.: US 9,454,039 B2
(45) Date of Patent: Sep. 27, 2016

(54) DISPLAY DEVICE FOR VEHICLE

(71) Applicant: YAZAKI CORPORATION, Tokyo (JP)

(72) Inventors: Junichi Matsushita, Shizuoka (JP); Kunimitsu Aoki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 149 days.

(21) Appl. No.: 14/199,109

(22) Filed: Mar. 6, 2014

(65) Prior Publication Data

US 2014/0184996 A1 Jul. 3, 2014

Related U.S. Application Data

(63) Continuation of application No. PCT/JP2012/072954, filed on Sep. 7, 2012.

(30) Foreign Application Priority Data

Sep. 9, 2011 (JP) ................................. 2011-197426

(51) Int. Cl.
*G02F 1/1335* (2006.01)
*G02F 1/13363* (2006.01)
*G02B 27/01* (2006.01)
*G02B 5/30* (2006.01)

(52) U.S. Cl.
CPC ....... *G02F 1/13363* (2013.01); *G02B 27/0101* (2013.01); *G02B 5/30* (2013.01); *G02B 2027/012* (2013.01)

(58) Field of Classification Search
CPC .................. G02B 27/0101; G02F 1/13363
See application file for complete search history.

(56) References Cited

U.S. PATENT DOCUMENTS

| 4,961,625 A * | 10/1990 | Wood ..................... G02B 27/01 359/630 |
| 5,231,379 A * | 7/1993 | Wood ..................... G02B 27/01 340/980 |
| 7,602,450 B2 | 10/2009 | Koma et al. |
| 8,422,112 B2 * | 4/2013 | Li ....................... G02B 27/0018 349/113 |
| 2007/0018907 A1 | 1/2007 | Koma et al. |
| 2013/0077284 A1 * | 3/2013 | Chang ..................... G02B 5/30 362/19 |

FOREIGN PATENT DOCUMENTS

| JP | 2-141720 A | 5/1990 |
| JP | 11-249062 A | 9/1999 |

(Continued)

OTHER PUBLICATIONS

International Search Report and Written Opinion of the International Search Report for PCT/JP2012/072954 dated Oct. 9, 2012.
English language Written Opinion of the International Search Report for PCT/JP2012/072954 dated Mar. 12, 2014.
The extended European Search Report for the related European Patent Application No. 12830239.5 dated Mar. 19, 2015.

(Continued)

*Primary Examiner* — James Dudek
(74) *Attorney, Agent, or Firm* — Kenealy Vaidya LLP

(57) ABSTRACT

A display device for a vehicle according to the present invention includes a display which emits an emission display light having a polarization plane in a specific direction, an illumination light source which illuminates the display, and a phase difference plate which is disposed facing the display in a state where a fast axis is shifted by a predetermined angle with respect to the polarization plane of the emission display light emitted by the display.

4 Claims, 6 Drawing Sheets

(56) References Cited

FOREIGN PATENT DOCUMENTS

| JP | 2006-91489 A | 4/2006 |
| JP | 2007-52383 A | 3/2007 |
| JP | 2008-70504 A | 3/2008 |
| JP | 2008-268680 A | 11/2008 |
| JP | 2010-113197 A | 5/2010 |
| JP | 2010-152025 A | 7/2010 |
| JP | 2011-152883 A | 8/2011 |
| WO | 89/03059 A2 | 4/1989 |

OTHER PUBLICATIONS

Japanese Office Action for the related Japanese Patent Application No. 2011-197426 dated Aug. 18, 2015.
Japanese Office Action for the related Japanese Patent Application No. 2011-197426 dated Feb. 23, 2016.
Shuji Koyanagi; OPUTORONIKUSU opto-electronics term dictionary; The 3rd edition; OPUTORONIKUSU; Nov. 21, 2005, 336th page.

* cited by examiner

FIG.3
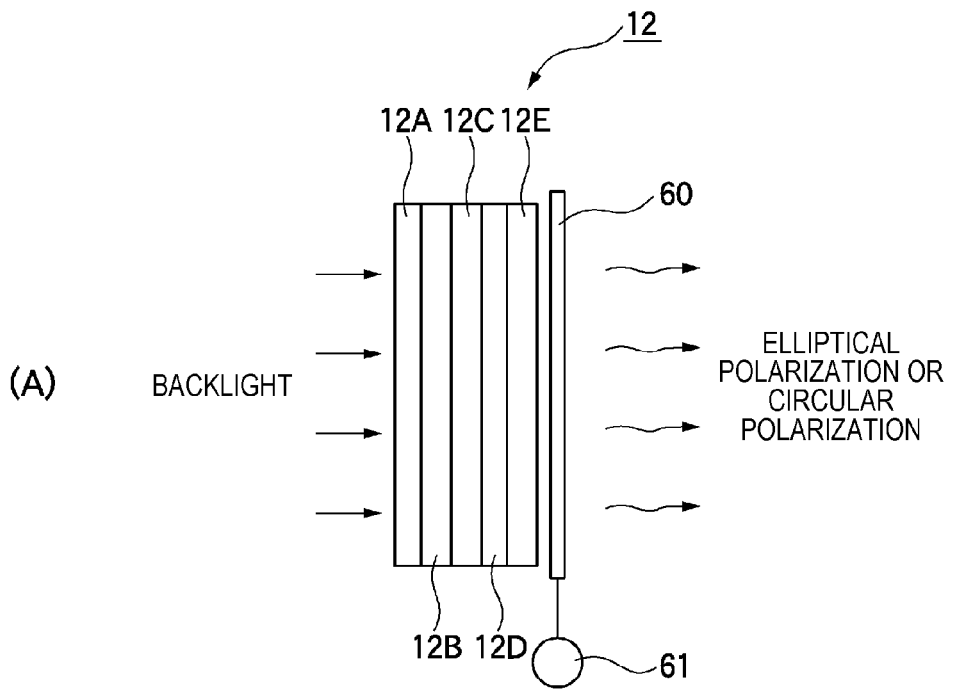
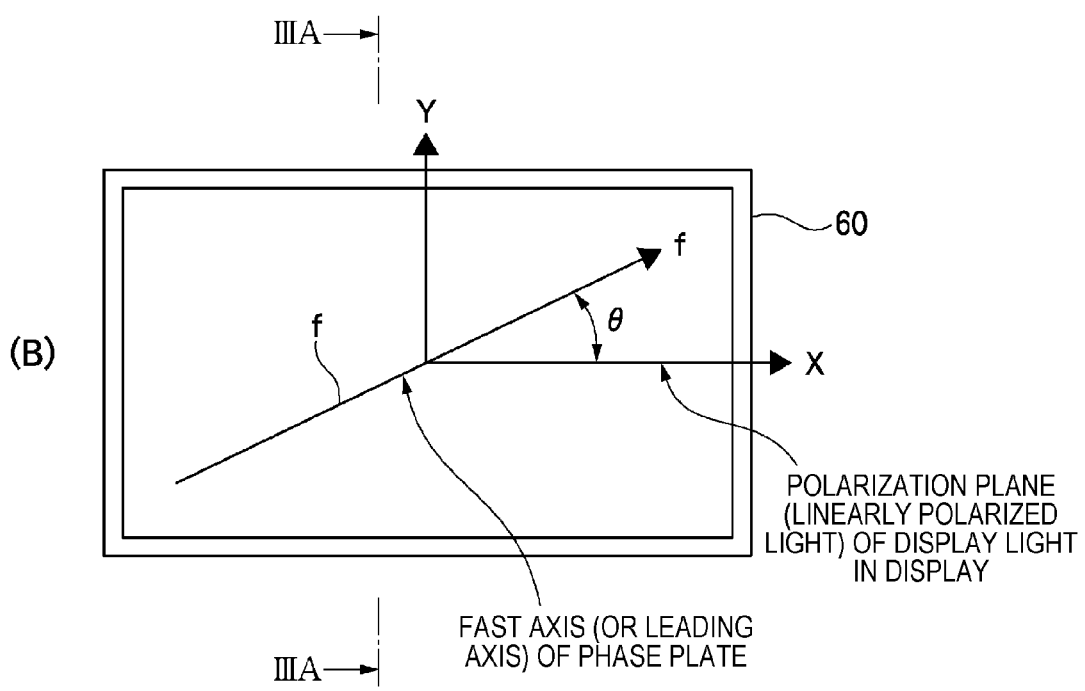

FIG.6
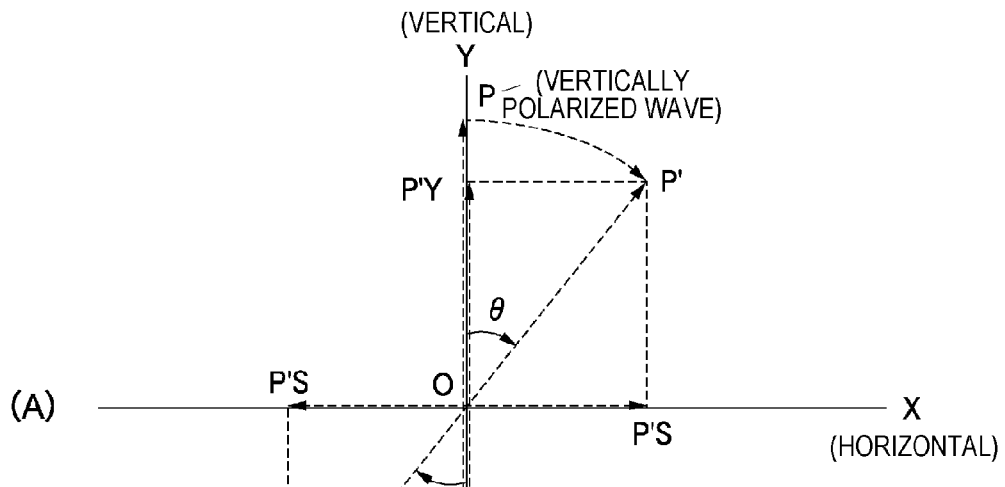
(A)
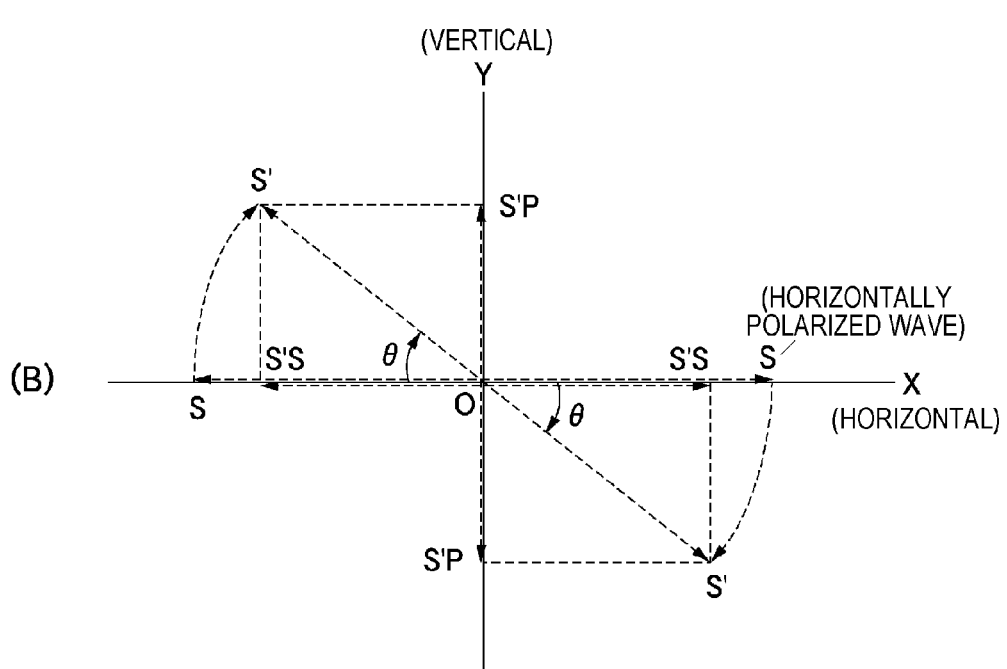
(B)

DISPLAY DEVICE FOR VEHICLE

CROSS REFERENCE TO RELATED APPLICATIONS

This application is a continuation of PCT application No. PCT/JP2012/072954, which was filed on Sep. 7, 2012 based on Japanese Patent Application (No. 2011-197426) filed on Sep. 9, 2011, the contents of which are incorporated herein by reference.

BACKGROUND OF THE INVENTION

1. Field of the Invention

The present invention relates to a display device for a vehicle which is useful in a head-up display or the like for a vehicle.

2. Description of the Related Art

As a display device for a vehicle, a HUD (Head-up display) device having a high visibility is sometimes employed in order to cause the driver to promptly recognize, for example, information which has a small information amount, but which has a high degree of urgency.

In a head-up display for a vehicle, a light image including visible information which is displayed on a display in the main unit of a display device is guided to the front of a windshield (front glass) of a vehicle, and projected to the windshield. When the driver sees the front in a usual driving position, the driver sees the visible information projected by the head-up display together with the landscape ahead which can be seen through the windshield. The visible information which is viewed by the driver is imaged as a virtual image in front of the surface of the windshield. While driving, therefore, the driver can simultaneously view both the landscape ahead and the display contents of the head-up display without shifting the driver's viewpoint.

In such a head-up display device, the main unit of the display device is usually placed in an instrument panel of a vehicle. Then, light of visible information which is displayed on a display in the main unit of the display device is projected through an optical path including a reflective member such as a mirror, toward a projection area such as a windshield or a combiner, and a virtual image is formed in front as viewed from the position of the viewpoint of the driver.

JP-A-2008-268680 discloses a conventional technique related to a head-up display for a vehicle. In JP-A-2008-268680, light emitting diodes which function as a light source for illumination, a lens array, a wiring board, a trimming filter, a liquid crystal display element, a cold mirror, a concave mirror, and a diffusion member are disposed in a housing of the main unit of the display device.

In the display device disclosed in JP-A-2008-268680, visible information is displayed in the transmissive liquid crystal display element, the element is illuminated with white light of the light emitting diodes which are placed behind the element, a light image due to illumination light transmitted through the liquid crystal display element is guided toward a windshield of a vehicle via the cold mirror and the concave mirror.

SUMMARY OF THE INVENTION

In a head-up display for a vehicle, a configuration is known in which a transmissive liquid crystal display element is configured so that only light having a polarization plane in a specific direction is transmitted through, for example, the horizontal polarization component is usually emitted (hereinafter, this is referred to as "horizontal polarization LCD"). In the type of such a horizontal polarization LCD, because of the inherent Brewster's angle of a windshield of a vehicle, display light is reflected at a high efficiency toward the viewer, and therefore a display image can be seen with high brightness.

The reflection light in the case where reflection is conducted at the Brewster's angle is configured by only S-polarization component, or horizontally polarized waves in the electromagnetic term. When the image is viewed in a state where the driver wears polarized sunglasses configured so as to eliminate the horizontal polarization component, therefore, it is usual that the display image cannot be seen. Consequently, polarized sunglasses which prevent unwanted images from being formed on the surface of a windshield, and the above-described head-up display cannot be used concurrently, thereby causing an inconvenience.

The present invention has been conducted in view of the above-discussed circumstances. It is an object of the present invention to provide a display device for a vehicle in which, even when polarized sunglasses are used, a display image displayed by a transmissive display element of a type in which the element has a polarization plane in a specific direction can be viewed.

In order to achieve the object described above, a display device for a vehicle is characterized by the followings (1) to (3).

(1) A display device for a vehicle comprising:
a display which emits an emission display light having a polarization plane in a specific direction;
an illumination light source which illuminates the display; and
a phase difference plate which is disposed facing the display in a state where a fast axis is shifted by a predetermined angle with respect to the polarization plane of the emission display light emitted by the display.

(2) The display device for a vehicle according to the configuration (1), wherein the phase difference plate is a λ/2 plate or a λ/4 plate.

(3) The display device for a vehicle according to the configuration (1) or (2), wherein the display includes a liquid crystal display of a light transmission type in which the emission display light has only a horizontal polarization plane, and
the illumination light source is placed on a side of a back surface of the liquid crystal display.

According to the display device for a vehicle having the configuration (1) above, even when the display light after transmission through the phase difference plate is incident on a windshield at the Brewster's angle, it is possible to produce polarized light containing a polarization component which enables reflection. It is further possible to produce polarized light which becomes reflection light so that the polarization component of the reflection light contains the same polarization plane as that in the transmission allowance direction of polarized sunglasses. Even when polarized sunglasses are used, therefore, a display image can be viewed. Moreover, it is requested only to additionally dispose the phase difference plate. Therefore, the cost and the size can be reduced, and the reliability is improved.

According to the display device for a vehicle having the configuration (2) above, in the case where the phase difference plate is a λ/4 plate, linear polarization of the emission display light after emission from the display is set to elliptical polarization, particularly, the fast axis is shifted by 45 degrees with respect to linear polarization of the emission display light after emission from the display. According to the configuration, circularly polarized light can be formed. Even when reflection light at a windshield is incidence/reflection at the Brewster's angle, therefore, reflection light of elliptical polarization (circular polarization in the case of 45 degrees) can be produced. As a result, even when polarized sunglasses which allow display light in any polarization direction are used, a display image can be viewed. Even when the viewer tilts the head or the body, particularly the display image can be viewed. Similarly, in the case where the phase difference plate is a λ/2 plate, a display image is allowed to be viewed through polarized sunglasses, by a simple configuration where the direction of the fast axis is placed while the shift of the relative rotation angle is adequately adjusted with respect to the polarization plane of the emission display light after emission from the display.

According to the display device for a vehicle having the configuration (3) above, a general-purpose tool can be applied in the display without newly using a dedicated tool. Therefore, the cost can be reduced.

According to the display device for a vehicle of the present invention, even when the display light after transmission through the phase difference plate is incident on a windshield at the Brewster's angle, it is possible to reflect the light, and to produce the reflection light so that the polarization component of the reflection light contains a component in a direction along which polarized sunglasses allow transmission. Even when polarized sunglasses having transmission characteristics in a specific polarization direction is used, therefore, a display image which is formed by display light from the display can be viewed.

In the above, the present invention has been briefly described. When a mode for carrying out the present invention which will be described below is through read with reference to the accompanying drawings, a detail of the present invention will be further clarified.

BRIEF DESCRIPTION OF THE DRAWINGS

In FIG. 3, (A) is an explanatory diagram (a sectional view taken along line IIIA-IIIA in (B) of FIG. 3) showing the arrangement configuration of a display device and phase difference plate in the head-up display device shown in FIG. 1, and in FIG. 3, (B) is a front view of the configuration.

In FIG. 6, (A) and (B) are diagrams respectively showing components of the horizontal (X) and vertical (Y) directions in the P-polarized light (P-wave) that is a vertically polarized wave in which the electric field component is parallel to the plane of incidence, and the S-polarized light (S-wave) that is a horizontally polarized wave in which the electric field component is perpendicular to the plane of incidence.

DETAILED DESCRIPTION OF THE EXEMPLARY EMBODIMENTS

Hereinafter, a specific embodiment of the display device for a vehicle according to the present invention will be described with reference to the accompanying drawings.

In the embodiment, a head-up display device 100 for a vehicle in which the display device for a vehicle according to the present invention is employed will be described.

Figure 1:
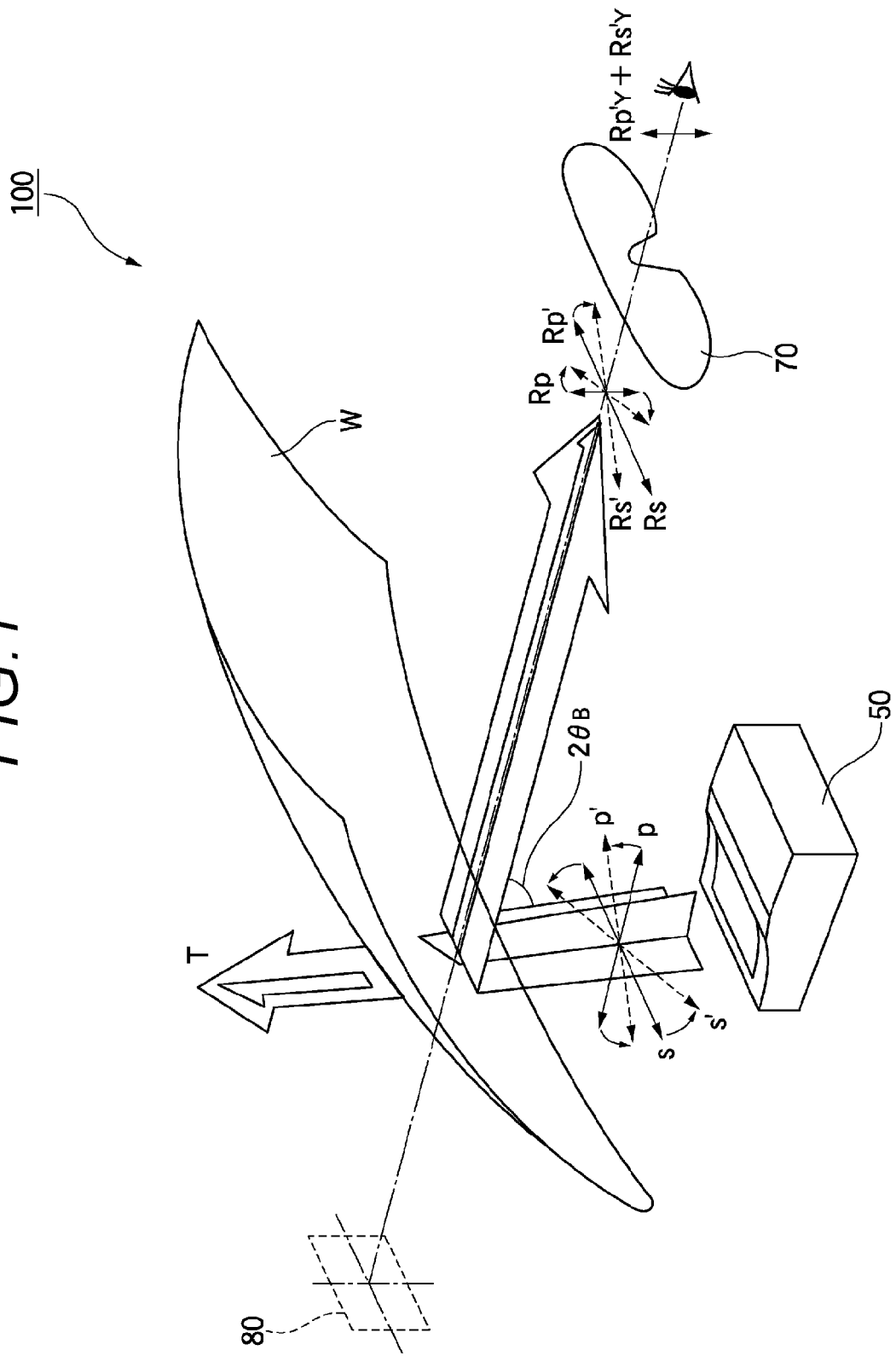
FIG. 1 is a schematic perspective view showing a head-up display device for a vehicle in which the display device for a vehicle according to the present invention is employed.

FIG. 1 shows the head-up display device 100. The head-up display device 100 includes: a HUD device main unit 50 shown in FIG. 2; a phase difference plate 60 which faces an opening 10A that is an emission portion of a display device 12 (described later) of the HUD device main unit 50, and which is disposed in the vicinity of the opening; and polarized sunglasses 70. According to the head-up display device 100, a virtual display image 80 can be viewed in front of a windshield W by using the polarized sunglasses 70.

Usually, the HUD device main unit 50 is housed inside an instrument panel of a vehicle, and, through a predetermined opening, projects light beams for display to a predetermined area on the windshield W of the vehicle.

Figure 2:
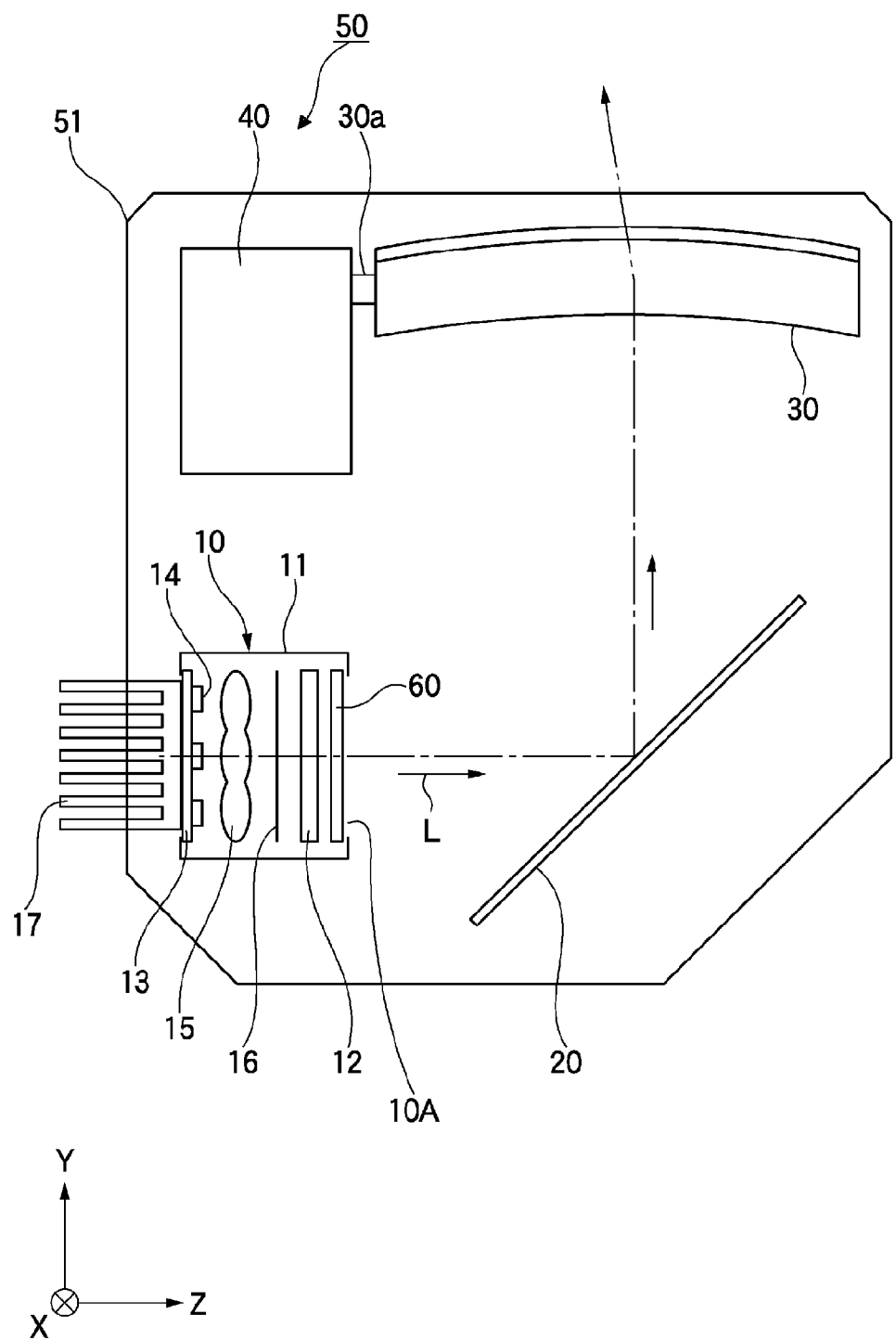
FIG. 2 is an explanatory diagram indicating the configuration of a specific example of the head-up display device shown in FIG. 1.

Inside a housing 51 of the HUD device main unit 50, as shown in FIG. 2, a light projecting unit 10, a turning mirror 20, an aspherical mirror 30, a rotating mechanism 40, the phase difference plate 60, and the like are disposed.

As shown in FIG. 2, the light projecting unit 10 includes a light-shielding casing 11, a transmissive liquid crystal display 12, an illumination circuit board 13, white light emitting diodes 14, a lens array 15, a light diffusion sheet 16, and a heat radiator (heatsink) 17. In the present invention, the light projecting unit 10 further includes the above-described phase difference plate 60.

The light-shielding casing 11 houses the various constitute elements of the light projecting unit 10 so that unwanted light does not leak from the light projecting unit 10 to the surroundings (lateral sides and the like). The transmissive liquid crystal display 12 is placed in the opening 10A disposed in the front surface of the light-shielding casing 11. Therefore, light of visible information which is displayed by the transmissive liquid crystal display 12 is transmitted through the phase difference plate 60, and then emitted in the Z direction as final display light L which will be described later, from the opening 10A of the light projecting unit 10.

The transmissive liquid crystal display 12 is a liquid crystal display which can display character information such as the reading of a speedometer (for example, "60 km/h") as visible information. Since it is of the transmission type, the back side of the transmissive liquid crystal display 12 is irradiated with illumination light to facilitate reading of the visible information. In the embodiment, an image of the displayed visible information needs to be reflected by the windshield W having a low reflectance, and therefore high-power illumination light is required.

Figure 4:
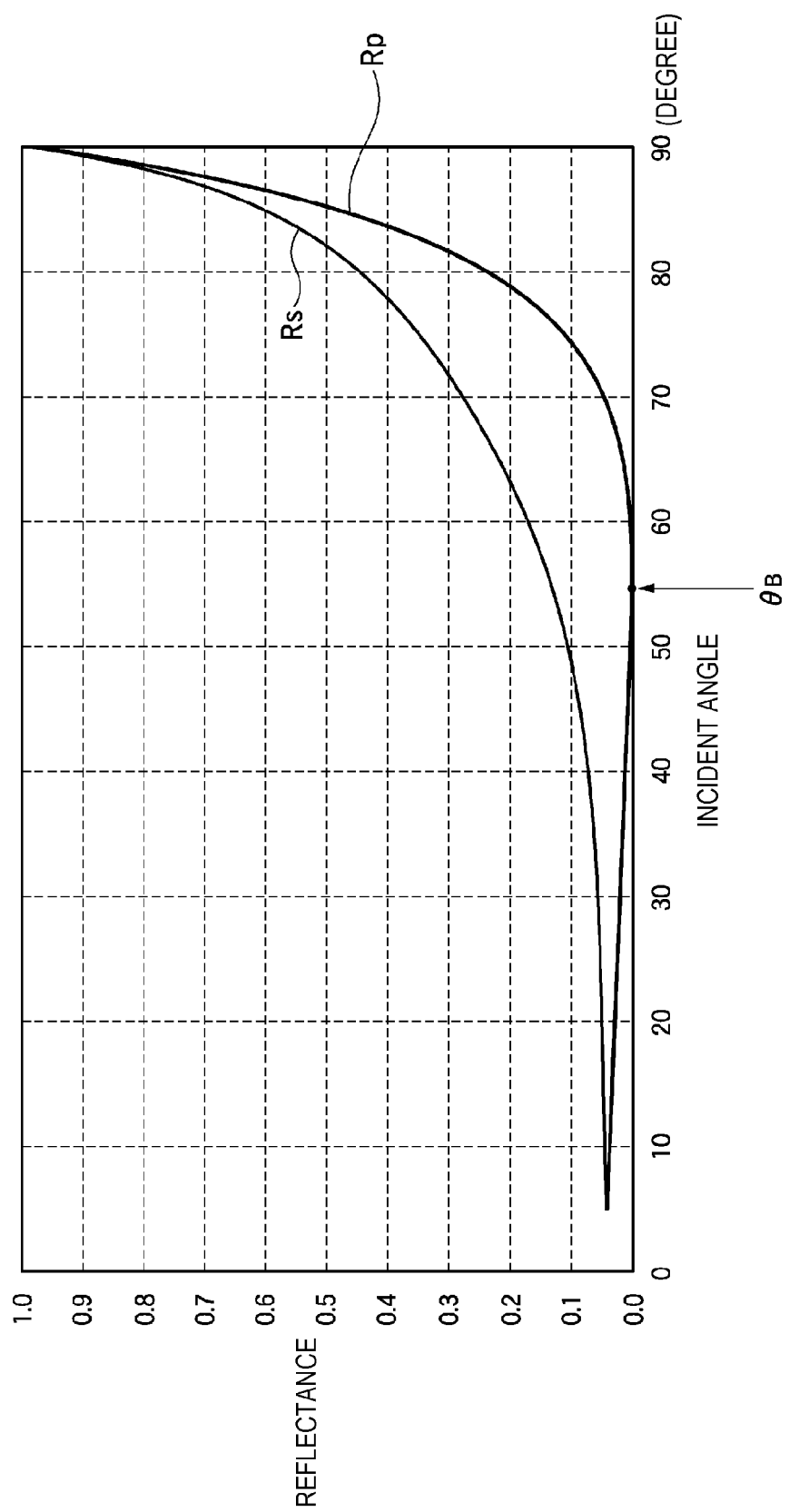
FIG. 4 is a characteristic diagram of reflection light showing optical characteristics of a windshield, such as the Brewster's angle, disposed in the head-up display device shown in FIG. 1.

The windshield W has optical reflection characteristics such as shown in FIG. 4, and the Brewster's angle (θB) of about 55 degrees.

The transmissive liquid crystal display (hereinafter, referred to as "display device") 12 in the embodiment constitutes a display, and uses the type in which illumination light functioning as display information has a horizontal polarization plane, i.e., a horizontal polarization type LCD. As shown in FIG. 3, for example, the display device 12 includes as the basic configuration a polarizing filter (through which only vertically polarized light is transmitted: first polarization plate) 12A, a glass substrate (individual electrodes) 12B, a liquid crystal layer 12C, a glass substrate (common electrode) 12D, a polarizing filter (through which only horizontally polarized light is transmitted: second polarization plate) 12E, and the like in the sequence from the rear surface side toward the front surface side along which light from the light source propagates.

In this way, in the display device 12, the polarizing filter (first polarization plate) 12A which is close to the rear surface (back surface) allows light having a vertical polarization plane to be transmitted therethrough. In the linearly polarized light after transmission through the liquid crystal layer 12C disposed ahead is converted, only light in which the electric field component is perpendicular to the plane of incidence, and which is a horizontally polarized wave (linearly polarized light having a horizontal polarization plane), i.e., only S-polarized light (S-wave) is transmitted through the polarizing filter (second polarization plate) 12E which is close to the front surface side of the display device 12. When the light is transmitted through the phase difference plate 60, the light is converted to light in which the phase is further shifted, and emitted to the outside from the opening 10A (see FIG. 2). In the case where the phase difference plate 60 is a 714 plate, for example, the light after transmission through the 714 plate is circularly polarized light. In the case where the phase difference plate 60 is a $\lambda/2$ plate, the light after transmission through the $\lambda/2$ plate is linearly polarized light which is rotated by a predetermined angle θ with respect to the polarization plane of a horizontally polarized wave.

The plurality of white light emitting diodes 14 and an electric circuit for driving them are mounted on the illumination circuit board 13. Each of white light emitting diodes 14 is configured by a combination of a light emitting diode (LED) which emits light at a specific wavelength such as a blue wavelength, and a fluorescent substance. Namely, the fluorescent substance placed in front of the LED is irradiated with blue light which is obtained by light emission of the LED, and the fluorescent substance is excited by the energy of the blue light, thereby causing the fluorescent substance to emit light. Therefore, the fluorescent substance emits light in a near-white wavelength region. That is, the wavelength conversion is performed by the fluorescent substance to produce white light from blue light. In the embodiment, a combination of the white light emitting diodes 14 and the fluorescent substance is used as the light source, but it is a matter of course that the present invention is not limited to this.

The lens array 15 condenses light emitted from the white light emitting diodes 14 to form parallel light directed toward the transmissive liquid crystal display 12. The light diffusion sheet 16 diffuses the light emitted from the lens array 15 to suppress unevenness of the illumination distribution.

Namely, the white light emitting diodes 14, lens array 15, and light diffusion sheet 16 which are in the light projecting unit 10 constitute an illuminating device (backlight) for illuminating the transmissive liquid crystal display 12.

The heat radiator 17 suppresses temperature rise caused by heat generation of the white light emitting diodes 14 and the components for driving them on the illumination circuit board 13. In order to enhance the effect of heat dissipation, the heat radiator 17 has a shape having a large surface area.

The turning mirror 20 is placed on an optical path along which the light (hereinafter, referred to as "final display light" L) that has been emitted from the display device 12 and transmitted through the phase difference plate 60 propagates, in a state where it is inclined by 45 degrees with respect to the propagation direction of the final display light L. The turning mirror 20 in the embodiment is configured by a member in which a film of metal such as aluminum is vapor-deposited. However, the present invention is not particularly limited to this. In the case where monochromatic light is handled, for example, the mirror may be configured by a multi-layer dielectric film.

The aspherical mirror 30 is coupled with the rotating mechanism 40. The rotating mechanism 40 can rotate the aspherical mirror 30 about a shaft 30a. According to the configuration, the projection direction of the projection functioning as the display image 80 can be adjusted.

The phase difference plate 60 is used for enabling the display image 80 of visual information formed on the side of the windshield W, to be viewed even when the polarized sunglasses 70 is used. The phase difference plate 60 in the embodiment is configured by a $\lambda/4$ plate, and converts linearly polarized light which is incident thereon, to circularly polarized light. As shown in FIG. 3(B), the phase difference plate 60 is placed while the fast axis (i.e., the leading axis f) of the phase velocity of two-axis light which propagates therein is rotated by the predetermined angle θ with respect to the polarization plane of horizontally polarized light which is the display light (this is referred to as "emission display light") immediately after emission from the display device 12. In the embodiment, particularly, the plate is placed so as to attain shifting of 45 degrees, and the incident linearly polarized light can be converted to circularly polarized light.

The phase difference plate 60 in the embodiment, as described above, the leading axis f is rotated by 45 degrees with respect to the polarization plane of the emission display light after transmission through the second polarization plate 12E of the display device 12. Therefore, the polarization planes of P and S component waves which are wave front components of the converted circularly polarized light can be rotated by a predetermined angle such as 45 degrees. As a result, the wave front components of the circularly polarized light which is display light. (final display light.) after transmission through the phase difference plate 60, i.e., the polarization planes of P and S component waves are incident on the windshield W at the Brewster's angle (θB) while maintaining the state where they are rotated by a predetermined angle such as 45 degrees in the phase difference plate 60.

With respect to the P-polarized light (hereinafter, P-wave) that, in the wave front components of the circularly polarized light, is a vertically polarized wave shown in FIGS. 1 and 6(A) in which the electric field component is parallel to the plane of incidence, the polarization plane is rotated by 45 degrees in the phase difference plate 60, and therefore a component wave indicated by P' (hereinafter, P'-wave) is produced. By contrast, also with respect to light in which the electric field component is perpendicular to the plane of incidence, and which is a horizontally polarized wave (linearly polarized light having a horizontal polarization plane), i.e., the S-polarized light (S-wave), as shown in FIGS. 1 and 6(B), a component wave indicated by S' (hereinafter, S'-wave) is produced. Even when the S polarization component of the S'-wave is incident on the windshield W at the Brewster's angle (θB), the component can be reflected therefrom. This is the S polarization component in the S'-wave, i.e., the reflection wave (RS'S). Similarly, even when the S polarization component in the P'-wave is incident on the windshield W at the Brewster's angle (θB), the component can be reflected therefrom. This is the S polarization component in the P'-wave, i.e., the reflection wave (RP'S).

With respect to the P'-wave shown in FIG. 6(A), even when it is incident on the windshield W at the Brewster's angle (θB), it is not entirely transmitted therethrough unlike a conventional case. In the P'-wave, the S polarization component (P'S) can be reflected by the windshield W. Namely, also with respect to the P'-wave which is incident at the Brewster's angle (θB), the S polarization component, i.e., the reflection wave (RP'S) which is reflected by the windshield W is produced. In the way, in the P'- and S'-waves of the wave front components of the circularly polarized light of the display light (final display light) after transmission through the phase difference plate 60 of the display device 12, also the P'-wave can be reflected by the windshield W. This is similarly applicable also to the S'-wave, and not all of the components produce the reflection wave. With respect to only the horizontally polarized wave component in the wave, the reflection wave (RS'S) which causes reflection is produced.

As described above, with respect to both the P'- and S'-waves which are incident on the windshield W at the Brewster's angle (θB), the reflection wave is produced. Among them, for example, the P'-wave after reflection, i.e., (RP'S) has a vertically polarized wave P'Y as a component as sown in FIG. 6(A). Therefore, the portion of the vertically polarized wave P'Y, i.e., the component (RP'Y) in the reflection wave (RP'S) can be transmitted through the polarized sunglasses 70. Similarly, the portion of the vertically polarized wave S'Y, i.e., the component (RS'Y) in the reflection wave (RS'S) can be transmitted through the polarized sunglasses 70.

In other words, in the polarized sunglasses 70 which selectively allows only the vertical polarization component of the reflection wave (RS'S) that is reflected by the windshield W, to be transmitted therethrough to be viewed, the vertical polarization component (RP'Y) in the reflection wave (RP'S) in the Pt-wave can be allowed to be transmitted therethrough. Therefore, the display image 80 which is a virtual image can be viewed. This is similarly applicable also to the S'-wave after reflection, i.e., (RS'S).

In the phase difference plate 60 in the embodiment which is configured by a λ/4 plate, as shown in FIG. 3(A), also a rotating mechanism 61 is additionally disposed as a rotating unit for adequately rotating the phase difference plate 60 at an arbitrary angle. The rotating mechanism 61 is not particularly essential. According to the rotating mechanism 61, when the polarization plane of the emission display light which is emitted as linearly polarized light from the display device 12 is to be rotated by the phase difference plate 60 to be shifted by 45 degrees, the phase difference plate 60 itself can be adequately swung. With respect to the phase difference plate 60 after it is disposed in the light-shielding casing 11 of the light projecting unit 10, therefore, the rotation angle of the fast axis can be thereafter adequately rotatedly adjusted.

According to the configuration, the component ratio of the P- and S-waves of the reflection light (R) from the windshield W can be adjusted, and the brightness of the display image 80 can be adjusted at any time including when the viewer wears the polarized sunglasses 70. When the rotating mechanism 61 is additionally disposed as described above, moreover, the placement angle of the phase difference plate 60 can be finely adjusted in accordance with the constitution and preferred posture of the viewer, or the state of the inclination angle of the windshield W disposed in the vehicle.

Next, the function of the embodiment will be described.

The light which is emitted from the white light emitting diodes 14 functioning as the light source of the light projecting unit 10 shown in FIG. 2 is transmitted through the lens array 15 and the light diffusion sheet 16 to be incident on the display device 12. In the display device 12 shown in FIG. 3, the first polarization plate 12A allows only light (vertically polarized light) having a vertical polarization plane to be transmitted through the first polarization plate 12A.

In the light which has been transmitted through the first polarization plate 12A, only linearly polarized light in a predetermined direction is incident on the liquid crystal layer 12C. While propagating through the liquid crystal layer 12C in the thickness direction, the incident light of linear polarization changes the polarization state in accordance with the anisotropy of refractive index (birefringence) of the liquid crystal. In the emission light which has been transmitted through the liquid crystal layer 12C, only the polarization plane in the horizontal direction (horizontally polarized light) which is limited by the second polarization plate 12E is emitted as the emission display light from the display device 12.

Thereafter, the emission display light is incident on the phase difference plate 60, the linearly polarized light having a horizontal polarization plane is converted to circularly polarized light. The polarization components of the circularly polarized light, namely, the polarization planes of the P and S component waves are rotated by the predetermined angle of 45 degrees by the phase difference plate 60. Thereafter, the display light which is turned by the turning mirror 20 is directed toward the aspherical mirror 30. The display light which is reflected by the aspherical mirror 30 is directed toward the windshield W which is a projection region.

The display light is incident on the windshield W while maintaining the circularly polarized light in the state where the polarization planes of the P and S component waves of the display light (emission display light) immediately after emission from the display device 12 are rotated by 45 degrees. With respect to the display light at this time, the projection direction of the projection functioning as the display image 80 can be adjusted by rotating the aspherical mirror 30 by the rotating mechanism 40. Therefore, the display light after transmission through the aspherical mirror 30 is incident on the windshield W at the incident angle of the Brewster's angle (θB).

As described above, according to the HUD device main unit 50 of the present invention, the linearly polarized functioning as the display light (emission display light) immediately after emission from the display device 12 is converted to circularly polarized light in the phase difference plate 60. Among this, with respect to the S-polarized light (S-wave) that is the horizontally polarized wave component, for example, the fast axis of the phase difference plate 60 is rotated by 45 degrees with respect to the emission polarization plane in the display device 12, and therefore the polarization plane is rotated by the degree corresponding to this or 45 degrees to be formed as the S'-wave. The light in this polarized state is incident on the windshield W, and a part of it is reflected.

Figure 5:
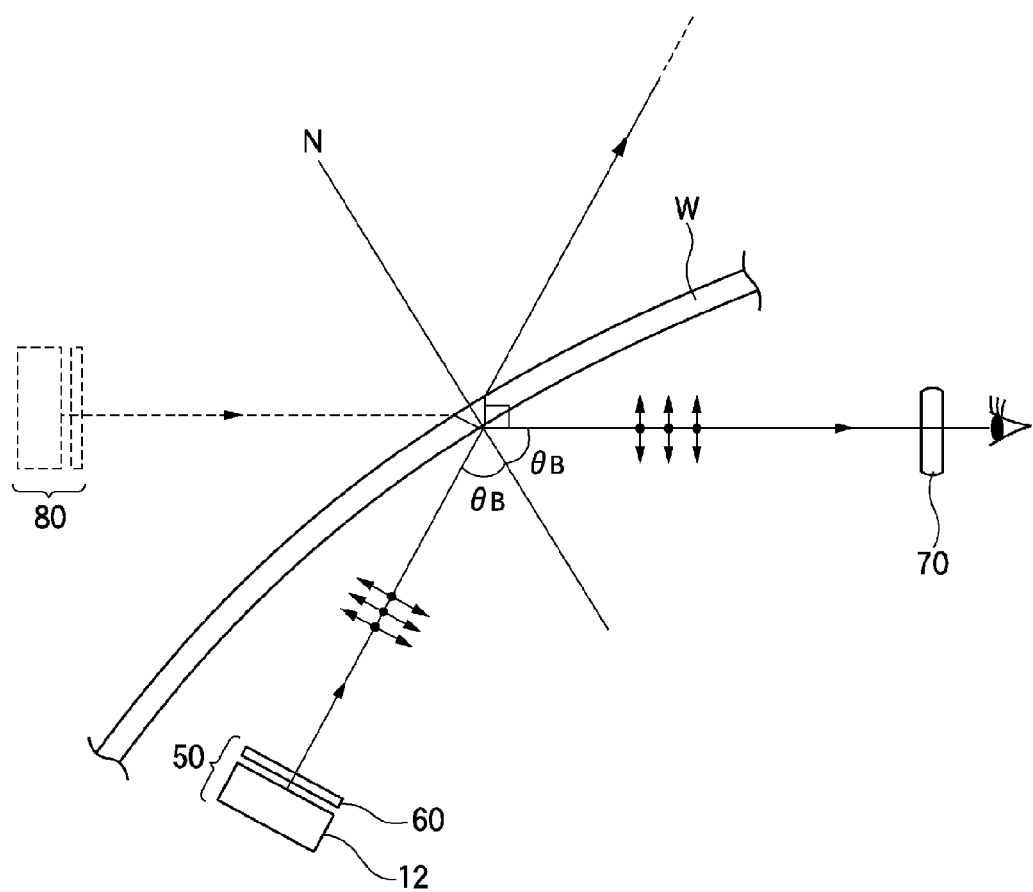
FIG. 5 is an explanatory diagram showing the function of the head-up display device shown in FIG. 1.

Moreover, not only the S'-wave, but also the P polarization component of the circularly polarized light which is produced in the phase difference plate 60 is formed as the P'-wave in which the polarization plane is rotated by 45 degrees. Also this has the reflection wave component (RP'S) which is reflected by the windshield W. Here, for example, the reflection wave (RP'S) in the P'-wave will be considered. This has the vertical polarization component (P'Y) such as shown in FIG. 6(A). In the polarized sunglasses 70 which selectively allows only the vertical polarization component to be transmitted therethrough to be transmitted therethrough to be viewed, the vertical polarization component (P'Y) in the reflection wave (RP'S) in the P'-wave is transmitted therethrough. This is similarly applicable also to the reflection wave components of the S'-wave. Since these components exist, as shown in FIG. 5, the display image 80 which is a virtual image formed by the display device 12 can be viewed even through the polarized sunglasses 70.

In a conventional head-up display device without a phase difference plate, among the display light incident on the windshield W, only the S-polarized light which is the horizontally polarized wave component is reflected here, and then directed toward the polarized sunglasses 70. In the polarized sunglasses 70, usually, the horizontally polarized wave component is blocked, and the display light is blocked, so that the display image 80 cannot be viewed. The polarized sunglasses 70 which were specially prepared cannot be used.

The polarized sunglasses 70 are used in a horizontal posture. Fundamentally, the viewer wearing the polarized sunglasses 70 must always keep the face horizontal. According to the embodiment, however, the phase difference plate 60 is configured by a λ/4 plate, the incident linearly polarized light is converted to circularly polarized light, and therefore the light has polarized waves of the P and S components, i.e., vertically and horizontally polarized waves.

According to the embodiment, even in the case where, for any reason during traveling of the vehicle, the face or the posture is inclined, or the face cannot be held in a state where the face is parallel to the horizontal surface of the windshield W, therefore, the display image 80 can be viewed. Namely, when the final display light is incident on the windshield W at the Brewster's angle, the reflection wave (RP'S) of the horizontal polarization component in polarized light of P'- and S'-polarization components can be reflected at a certain rate. Also in such a case, therefore, the display image 80 can be viewed. In the embodiment, it is requested only to additionally dispose a phase difference plate in a conventional head-up display device. Therefore, the cost and the size can be reduced, and the reliability is improved.

Furthermore, the present invention is not limited to the embodiment which has been described above, and may be implemented while appropriately changing within the range not departing from the scope of the present invention.

In the embodiment, for example, a λ/4 plate is used as the phase difference plate 60. In place of this, a λ/2 plate may be used as the phase difference plate. In the case where a λ/2 plate is used, it is preferable that, for example, the fast axis (leading axis f) is placed so as to be shifted by a predetermined angle θ such as 22.5 degrees with respect to the horizontal polarization plane of the display light (emission display light) immediately after emission from the display device 12. Also, in the case of a λ/4 plate, a rotating unit for adequately rotating a relative placement with respect to the display device 12 may be additionally disposed.

When a λ/2 plate is placed as described above, the polarization plane can be rotated by an angle of 2θ degrees (for example, 45 degrees) with respect to the emission display light from the display device 12 having a polarization plane in which the polarization direction is horizontal. According to the configuration, with respect to the display light which is incident on the windshield W at the incident angle of the Brewster's angle (θB), the reflection light (R) can contain not only the S-wave but also the P-wave. As a result, the viewer can view the display image 80 through the polarized sunglasses 70.

In the embodiment, an indicator of the display device for a vehicle is applied to a speedometer or the like. The present invention is not particularly limited to this. That is, the present invention can be applied to various instruments and the like such as a fuel meter section, a tachometer section, and a water temperature gauge.

As described above, the display device for a vehicle of the present invention can be used as, for example, a head-up display including a display which displays visible information, and an illumination light source which illuminates the display.

Hereinafter, the features of the above-described embodiment of the display device for a vehicle according to the present invention are listed briefly and summarily in items [i] to [v] below.

[i] A display device for a vehicle including:
a transmissive liquid crystal display (12) which emits an emission display light having a polarization plane in a specific direction;
a white light emitting diode (14) which illuminates the transmissive liquid crystal display (12); and
a phase difference plate (60) which is disposed facing the transmissive liquid crystal display (12) in a state where a fast axis is shifted by a predetermined angle with respect to the polarization plane of the emission display light emitted by the transmissive liquid crystal display (12).

[ii] The display device for a vehicle according to [i] above, wherein
the phase difference plate (60) is a λ/2 plate or a λ/4 plate.

[iii] The display device for a vehicle according to [i] or [ii] above, wherein
the transmissive liquid crystal display (12) includes a liquid crystal display of a light transmission type in which the emission display light has only a horizontal polarization plane, and
the white light emitting diode (14) is placed on a side of a back surface of the liquid crystal display.

Although the present invention has been described in detail and with reference to the specific embodiment, it is obvious to those skilled in the art that various changes and modifications can be made without departing from the spirit and scope of the present invention.

The display device for a vehicle according to the present invention can be used for a head-up display for a vehicle, and is useful.

What is claimed is:

1. A display device for a vehicle comprising:
a display which emits an emission display light having a polarization plane only in a horizontal direction;
an illumination light source which illuminates the display;
a phase difference plate, a λ/4 plate, which is disposed facing the display in a state where a fast axis is shifted by 45 degrees with respect to the polarization plane of the emission display light emitted by the display;
an adjusting mechanism which variably adjusts an incident angle of a final display light incident on a windshield of the vehicle such that the final display light is incident on the windshield at Brewster's angle as the incident angle, wherein the final display light indicates a display light transmitted through the phase difference plate; and
a rotating mechanism which rotates the phase difference plate at an arbitrary angle.

2. The display device for a vehicle according to claim 1, wherein
the display includes a liquid crystal display of a light transmission type in which the emission display light has only a horizontal polarization plane, and
the illumination light source is placed on a side of a back surface of the liquid crystal display.

3. A display device for a vehicle comprising:
- a display which emits an emission display light having a polarization plane only in a horizontal direction;
- an illumination light source which illuminates the display;
- a phase difference plate, being a λ/2 plate, which is disposed facing the display in a state where a fast axis is shifted by 22.5 degrees with respect to the polarization plane of the emission display light emitted by the display;
- an adjusting mechanism which variably adjusts an incident angle of a final display light incident on a windshield of the vehicle such that the final display light is incident on the windshield at Brewster's angle as the incident angle, wherein the final display light indicates a display light transmitted through the phase difference plate; and
- a rotating mechanism which rotates the phase difference plate at an arbitrary angle.

4. The display device for a vehicle according to claim 3, wherein
- the display includes a liquid crystal display of a light transmission type in which the emission display light has only a horizontal polarization plane, and
- the illumination light source is placed on a side of a back surface of the liquid crystal display.

* * * * *